form of apparatus may be used for this purpose. Therefore, an ordinary form of apparatus has been diagrammatically illustrated.

A plurality of manholes 66 are provided in the back wall 17 of the tower to provide ready access to the interior of the tower, for removal of the collected and formed salts or to make repairs or adjustments.

According to our method a quantity of raw or weak liquor is admitted to the chamber X of the tower B, through the inlet 37. The pump 38 is then set in operation to draw the liquor from this chamber and force it upwardly through the main 40.

The valved connections 48 and 58 are adjusted so that liquor from the main 40 will flow therethrough and into the sprays 50 and nozzles 56, respectively. The nozzle 42 is connected at all times with the main 40 through a branch 41, thereby providing a spray of raw or weak liquor against the shield 35. The valve 51 in the main 47 is normally closed and the main 40 is in open communication with the main 47. Therefore the upper portion of main 47 will convey a weak liquor to the manifold chamber 52 and sprays 53.

The furnace A is fired when the pump 38 is started, thereby producing a quantity of hot gases which will pass through into the tower B and rise to meet the down coming liquor. Air is forced through the air duct 10 and inlets 11 while the furnace is in operation, thereby creating a draft to force the products of combustion and hot gases up through the tower B.

The liquor being sprayed into the tower through the sprays 50 and nozzles 56, will fall onto the shield 36 and be directed into the chamber Y, while the liquor sprayed through the sprays 53 will fall over the upper unit of baffles and into the trough 32 from which it will be conducted into the settling basin 23.

As the liquor is sprayed into the tower it must fall against the counter-current of hot gases, which cause it to give up its water and soluble tar vapors, forming a concentrated solution and salt crystals.

As the chamber Y becomes sufficiently filled with concentrated and salt ladened liquor, the pump 44 is started in motion to force the concentrated and salt ladened liquor into the main 47, and the valved connections 48 and 58 are adjusted so that the nozzles 56 will receive their supply entirely from the main 47, and the sprays 50 will receive a mixed supply from both mains 40 and 47.

The apparatus will then re-circulate the liquid from the chamber Y and settling tank 23 until the desired degree of saturation is obtained, and at the same time continually draw raw or weak liquor from the chamber X by means of the pump 38 which will force it through the mains 40 and upper portion of main 47, such liquor being mixed with the saturated liquor from main 47, in the sprays 50, and being fed exclusively through the sprays 53. The liquor from the sprays 53 is concentrated as it falls over the baffles C in the upper unit, and also is saturated with salt crystals carried upwardly mechanically by the hot gases and is, therefore, conducted directly into the settling chamber 23.

As the liquors become saturated, the salts are removed in any desired manner from the settling basin 23. Preferably the ejector 65ª will be employed to force the salts from the basin 23 into the salt box 65.

The above method requires less heat, causes a more efficient purification of the liquors by aeration, and concentrates the liquors to the desired degree in less time than any method employed or known heretofore.

We claim:—

1. The method of treating crude ammonia liquor from by-product coke plants to recover the salts of ammonium chloride and other salts therein, which consists in passing such liquor down through a tower over non-corrodible baffles, and passing a counter-flow of hot gas up through said tower, spraying a quantity of the liquor into the path of said hot gas and up against the lower baffles, collecting all of said liquor in the lower portion of the tower, and passing said liquor in a continuous circuit from the bottom of the tower upward through suitable conduits and spraying it down over said baffles against said counter-flow of hot gas, causing it to evaporate until the desired degree of concentration is effected.

2. The method of treating crude ammonia liquor from by-product coke plants to recover the salts of ammonium chloride and other salts therein, which consists in providing a body of said liquor in a basin at the lower end of a tower, continuously circulating said liquor upwardly through suitable conduits along said tower and spraying it into the tower so as to cause it to pass down through said tower over a plurality of non-corrodible baffles, passing a counter-flow of hot gases up through said tower to concentrate said liquor to the desired degree, and spraying a quantity of the liquor into the path of said hot gases and up against the lower baffles to protect them from inqury by the hot gases and to prevent salting thereon.

3. The method of treating crude ammonia liquor from by-product coke plants to recover the salts of ammonium chloride and other salts therein, which consists in providing a body of said liquor in a basin at the lower end of a tower, continuously circulating said liquor upwardly through suitable conduits along said tower and spraying it Patented May 15, 1923.

1,455,300

UNITED STATES PATENT OFFICE.

JAMES H. MATTHEWS, OF PITTSBURGH, AND WILLIAM R. ECKE, OF EMSWORTH, PENNSYLVANIA, ASSIGNORS TO JAMES H. MATTHEWS & COMPANY, OF PITTSBURGH, PENNSYLVANIA, A CORPORATION OF PENNSYLVANIA.

METHOD OF AND MACHINE FOR SWAGING BLANKS.

Application filed March 29, 1920, Serial No. 369,667. Renewed April 9, 1923.

*To all whom it may concern:*

Be it known that we, JAMES H. MATTHEWS, residing at Pittsburgh, in the county of Allegheny and State of Pennsylvania, and WILLIAM R. ECKE, residing at Emsworth, in the county of Allegheny and State of Pennsylvania, both citizens of the United States, have invented or discovered certain new and useful Improvements in Methods of and Machines for Swaging Blanks, of which improvements the following is a specification.

Our invention relates to improvements in methods of and machines for swaging blanks for dies and master dies. Fig. I is a view partly in side elevation, partly in vertical section of a machine in which and in the operation of which our invention resides; Fig. II is a view in end elevation and Fig. III a view in side elevation, and to larger scale than Fig. I, of a die blank which has undergone the swaging operation.

While not so narrowly limited in applicability, we shall, by way of example, describe our invention applied to the manufacture of dies of tool steel, such as are now commonly used for stamping characters upon the surfaces of metal articles.

Such a die is illustrated in Figs. II and III. It is formed of tool steel. The surface configuration is in this case that of the letter A. This character stands in relief; its members rise to an edge like a cold chisel, and when the tool is applied like a cold chisel to a metal surface and struck by a hammer upon its end, these edges cut into and imposed upon the metal surface the character which the die bears.

The die is shaped by swaging under another master die, while the steel of which it is composed is still unhardened. When shaped, it is hardened, and it then is serviceable.

It is difficult, in swaging these dies in the manner heretofore prevalent, to cause the metal of the blank to rise and fully fill all the concavities of surface configuration of the master die; very great swaging pressure is required, to reduce to a practicable minimum the percentage of defectives in output. In the practice of our invention, exaction respecting pressure is not so great, and the percentage of defective article in the output is diminished.

In the machine of Fig. I of the drawings a suitable frame 1 carries an anvil block 2. This anvil block may be elevated in frame 1 by the action of wedges 3 driven by a screw 4. In the anvil block 2 is a seat for a blank *a*. It is upon the upper surface of this blank *a* that a configuration is to be imposed by swaging—such a configuration, for example, as that of the die of Figs. II and III.

In the upper part of the frame 1, in axial alignment with the seat in anvil 2 for the blank is a rotatable shaft 5, and means are shown for powerfully rotating it, from a shaft 6 through bevelled gears 7 and 8. The shaft 5 carries splined to it a disk 9 and on the face of disk 9 is carried a member 10. To member 10 a member 11 is connected, by ball-and-socket joint, as the drawing shows. Member 11 is provided with a seat for a master die *b*, and member 11 becomes, as related to anvil member 2, a hammer member. The member 10 is secured to disk 9 by means, such as bolts 12 passing through slots, which admit of adjustment of the ball and socket joint to a position of greater or less eccentricity with respect to the axis of shaft 5. A guide 13 holds member 11 so positioned that a master die *b* secured in it stands face to face with a blank *a* set in anvil block 2.

It will be seen that member 10 being set as shown, eccentrically with respect to shaft 5, rotation of the shaft will cause master die *b* to roll relatively to blank *a* in what may properly be termed an orbital motion. In this motion, there will be no advance of die *b* or of any portion of it in circumferential direction respecting the axis of turning of shaft 5, but there will be an orbital progress of the tipping position of the die around that center of turning.

While rotation is maintained of shaft 5, with the consequent effect in the movement of die *b* which has been described, blank *a* is by the turning of screw 4 raised and swaging pressure exerted between blank and die.

The consequence is that, instead of having the swaging pressure spread over all the area of the meeting faces of die and blank, that pressure is localized and confined to a smaller region, where being concentrated it becomes proportionately more effective; furthermore, as the orbital motion of the tipping of the die progresses, the region of The back wall 17 has a cutaway portion at its bottom forming an outlet 22 opening into a settling chamber or basin 23, which is provided with a depression 24 in its bottom so as to allow for complete drainage of all liquid.

Spaced at intervals along the length of the tower from a point considerably above the top of the furnace, are a plurality of baffle supports 25, which are composed of wood or other non-corrosive material. The supports 25' are spaced so as to form upper and lower units or groups, and each support is mounted rigidly in the side walls of the tower to support suitable baffles C.

The baffles C are composed of bottom and top layers of sections 26$^c$, each section being composed of a plurality of slats 26 set edgewise and spaced by separators or spacers 25, and held together by suitable pins 27 which pass through the slats and separators and have wedges 28 passing through their ends to bind the parts together. The under sides of the slats 26 are notched at 29 to fit over the supports 25', and further cut away to form a plurality of drip points 30.

The sections 26 forming the lower layer are supported directly upon the supports 25', and the slats extend at right angles to said supports, while the sections 26$^c$ of the top layer are supported on the lower sections and extend the opposite direction or at right angles to the sections of the bottom layer, thereby forming a checker-like baffle.

The baffles C are composed completely of wood or other non-corrosive material.

The liquor which is treated in the upper portion of the tower and which will fall or be sprayed over the upper unit or group of baffles is of different quality than that to be treated in the lower portion, and therefore, is caught before it falls onto the lower unit or group of baffles in an annular trough 32. A suitable cone-shaped shield 33 is arranged centrally within the tower and spaced above the trough 32, and has its lower edges overlying the inner edge of the trough so as to direct the liquor into the trough.

A deflecting shield or baffle plate 35 is secured to the front wall 16 of the tower, slightly above the furnace A, and extends downwardly and inwardly on an angle, so as to deflect a spray of liquor in sheet formation past the mouth of the furnace A and into the chamber X of the tower, thereby preventing the volatilization of the ammonium chloride, and further providing a means of regulating the temperature of the gases entering the stack by spraying different quantities of liquor onto the deflecting shield or baffle plate.

A second shield or baffle plate 36 is secured above the shield 35 and extends inwardly and downwardly on a greater angle than the shield 35 so as to overlie the same and receive and direct the liquor falling from the baffles C and direct it into the chamber Y of the tower.

The liquor to be treated, which is termed weak liquor, enters the chamber X of the tower A through a suitable inlet 37 and is drawn from the chamber X by a pump 38 having an inlet pipe 39 communicating with the chamber. The pump 38 forces the weak liquor upwardly through a main 40 running parallel with the rear wall of the tower. A suitable branch pipe 41 is connected with the pipe 40 and is provided with a nozzle 42 to provide a spray of weak liquor against the shield 35.

A suitable pump 44 having inlet pipes 45 and 46 communicating with the chamber Y and settling basin 23 respectively, is provided to draw the saturated or already treated liquor from the chamber Y and settling basin 23, and to force said liquor upwardly through a main 47 which extends the entire height and parallel with the tower.

A suitable valved branch connection 48 leads from both of the mains 40 and 47 to a suitable manifold distributor 49, having a plurality of sprays 50 adapted to spray liquor over the lower unit of baffles.

The main 40 is connected with the main 47 at a point above the branch 48, and the main 47 is provided with a valve 51 below this connection so that the flow of liquor from pump 44 will normally be shut from this portion of the main.

A second manifold distributor 52 having a plurality of sprays 53 is provided to spray liquor from the top of the tower over the upper unit of baffles. The manifold distributor is connected with the upper end of main 47 by a branch 55.

At a point below the lowermost hurdle C, or in the hot zone, a plurality of spray nozzles 56 extend through the walls of the tower. Nozzles 56 are connected to a supply pipe 57 which is connected to the mains 40 and 47 by suitable valved connections 58, and are adapted to normally take their supply from the main 47, thereby spraying saturated liquor into the products of combustion and against the lower baffles, to protect said baffles against disintegration due to overheating, and such spray also serving to further condense the liquor.

The spraying of weak liquor through the sprays 53 serves to condense the liquor, and also to wash down any traces of ammonium chloride in the form of salt carried up mechanically by outgoing vapors and the products of combustion. The condensed liquor and salts from the upper unit of baffles falls into the trough 32 and is conveyed by a main 60 downward into the settling basin 23.

A suitable salt ejector 65$^a$ and salt box 65 is arranged above the settling chamber 23 to remove the salt therefrom. Any suitable ous swaging pressure between die and blank over a region of contact less than the whole area of the faces of die and blank, and causing such contact, advancing into new regions, to traverse progressively the entire area.

4. The herein described method of making dies with cutting edges raised in relief upon their faces, which consists in bringing an unhardened blank and a forming member into face to face contact, then while maintaining a continuous swaging pressure between them, rolling one of said parts in orbital motion upon the other, and finally hardening the article.

5. In a machine for swaging blanks the combination with means for sustaining blank and die opposite one another and with axes angularly disposed one to the other, blocks engaging the otherwise free ends of said members, and means for imposing through said blocks both swaging pressure and orbital motion, substantially as described.

6. In a machine for swaging die blanks the combination of a master die having a surface of generally convex conformation and symmetrical with respect to a point, means for sustaining such die and the blank to be swaged with the point of symmetry of the die lying in the axis of the blank and the axis of the die angular to the axis of the blank, follower blocks adapted to bear upon die and blank, and to exert thereon swaging pressure, one of said follower blocks having an orbital motion around the prolonged axis of the opposite member, substantially as described.

7. In a machine for swaging dies the combination of an anvil member and a hammer member, provided with seats for master die and blank, a rotary shaft, a block borne by said shaft, ball-and-socket connection between block and hammer member, said block being adjustable in its bearing upon said shaft, substantially as described.

In testimony whereof we have hereunto set our hands.

JAMES H. MATTHEWS.
WILLIAM R. ECKE.

Witnesses:
WM. M. JENKINS,
H. W. LAUDERMILCH.